(12) United States Patent
Saquib

(10) Patent No.: US 7,133,569 B1
(45) Date of Patent: Nov. 7, 2006

(54) ALIASING ARTIFACT ATTENUATION SYSTEM

(75) Inventor: Suhail S. Saquib, Shrewsbury, MA (US)

(73) Assignee: Polaroid Corporation, Waltham, MA (US)

( * ) Notice: Subject to any disclaimer, the term of this patent is extended or adjusted under 35 U.S.C. 154(b) by 1036 days.

(21) Appl. No.: 09/628,629

(22) Filed: Jul. 31, 2000

(51) Int. Cl.
*G06K 9/40* (2006.01)

(52) U.S. Cl. .................... 382/262; 358/515

(58) Field of Classification Search ............... 382/254, 382/260–269, 275, 100; 348/253, 571, 607, 348/612, 618, 621, 631, 663, 665, 666
See application file for complete search history.

(56) References Cited

U.S. PATENT DOCUMENTS

| | | | | |
|---|---|---|---|---|
| 4,663,655 A | | 5/1987 | Freeman ..................... 358/41 |
| 4,724,395 A | | 2/1988 | Freeman ..................... 328/151 |
| 4,774,565 A | * | 9/1988 | Freeman ..................... 348/242 |
| 4,989,090 A | * | 1/1991 | Campbell et al. ........... 348/451 |
| 5,148,278 A | * | 9/1992 | Wischermann .............. 348/609 |
| 5,237,402 A | * | 8/1993 | Deshon et al. ............... 358/520 |
| 5,448,301 A | * | 9/1995 | Michener .................... 348/578 |
| 5,479,440 A | * | 12/1995 | Esfahani ..................... 375/346 |
| 5,528,301 A | * | 6/1996 | Hau et al. .................... 348/441 |
| 5,623,317 A | * | 4/1997 | Robinson et al. ........... 348/584 |
| 5,831,677 A | * | 11/1998 | Streater ................. 375/240.12 |
| 5,832,120 A | * | 11/1998 | Prabhakar et al. .......... 382/233 |
| 5,832,134 A | * | 11/1998 | Avinash et al. ............. 382/257 |
| 5,841,480 A | * | 11/1998 | Rhodes ....................... 348/459 |
| 5,844,617 A | * | 12/1998 | Faroudja et al. ............ 348/441 |
| 5,919,137 A | * | 7/1999 | Finger et al. ................ 600/443 |
| 5,929,918 A | * | 7/1999 | Marques Pereira et al. . 348/448 |
| 6,124,893 A | * | 9/2000 | Stapleton .................... 348/441 |
| 6,192,079 B1 | * | 2/2001 | Sharma et al. ......... 375/240.16 |
| 6,337,645 B1 | * | 1/2002 | Pflaumer .................... 341/143 |
| 6,519,288 B1 | * | 2/2003 | Vetro et al. ............ 375/240.21 |
| 6,577,352 B1 | * | 6/2003 | Park et al. ................... 348/624 |
| 6,643,416 B1 | * | 11/2003 | Daniels et al. .............. 382/299 |

* cited by examiner

*Primary Examiner*—Vikkram Bali
*Assistant Examiner*—Anand Bhatnagar

(57) ABSTRACT

A multi-resolution filter is provided that may be used to attenuate aliasing artifacts in a digital input signal, such as a digital image acquired by a digital camera. The multi-resolution filter reduces the resolution of the digital input signal and filters the reduced resolution signal using a median filter. The output of the median filter is provided to an interpolation filter, which increases the resolution of the median filter's output to produce a digital output signal in which aliasing artifacts from the digital input signal have been attenuated. The multi-resolution filter may be advantageously applied to the chrominance channels of digital images to attenuate aliasing artifacts without undesirably blurring sharp luminance and color boundaries in the digital image. Furthermore, the computational expense associated with the median filter is diminished by reducing the resolution of the digital input signal before filtering it using the median filter.

46 Claims, 12 Drawing Sheets

ALIASING ARTIFACT ATTENUATION SYSTEM

BACKGROUND

1. Field of the Invention

The present invention relates to digital signal processing and, more particularly, to attenuation of aliasing artifacts in digital images.

2. Related Art

A conventional digital image may be represented as a two-dimensional array of pixels. Each pixel within the digital image may be uniquely identified by its column and row coordinates, which are typically numbered sequentially beginning with zero. For example, the upper-leftmost pixel of a digital image is typically specified by the coordinates (0,0) and, more generally, a pixel at column c and row r is specified by coordinates (c, r). Although a variety of conventional coordinate schemes exist, the coordinate scheme just described will be used herein for purposes of example.

Each pixel in a digital image has a value that specifies the color of the pixel. For example, in a monochrome (black-and-white) image, the value of each pixel may be either one of two possible values (such as zero and one), indicating whether the pixel is black or white. The values of pixels in a grayscale digital image are typically limited to a predetermined range of values corresponding to shades of gray ranging from pure black to pure white. For example, pixel values in a grayscale digital image may be limited to the range of 0–255, where zero represents black, 255 represents white, and intermediate values represent intermediate shades of gray.

In a color digital image, the value of each pixel corresponds to the pixel's color. The fact that the human eye has three different kinds of cones for sensing color enables us to represent all possible colors in a three-dimensional color space. A variety of three-dimensional color spaces can be employed to represent the same color. The axes of these various color spaces differ in the attributes of color that they represent. For example, one conventional class of color spaces is the red-green-blue (RGB) class of color spaces, in which the three axes correspond to red, green, and blue color components. Each three-dimensional coordinate within an RGB color space corresponds to a particular combination of red, green, and blue color components that uniquely specify a color within the color space. Another similar class of color spaces is the cyan-magenta-yellow class of color spaces, in which the three axes correspond to cyan, magenta, and yellow color components. Another class of color spaces represent the pixel's color in terms of luminance and chrominance components. The luminance component is related to the intensity or brightness of a pixel. This is the component that is captured on a black and white photograph or is displayed on a black and white TV. The two-dimensional space that is orthogonal to the luminance is spanned by the chrominance components. These components capture the color of the pixel. These two-dimensional chrominance spaces can be represented in either polar or Cartesian coordinates. When polar coordinates are used, the angle captures the hue of the color and the distance from the origin captures the saturation of the color. Examples of such color spaces are hue-saturation-brightness (HSB) and hue-lightness-saturation (HLS). Examples of standard color spaces in which the chrominance components are represented in a Cartesian coordinate system are LAB and YIQ.

In a color digital image represented according to a three-dimensional color space, such as an RGB color space, the value of each pixel includes three color components, each of which corresponds to a particular axis (e.g., the red, green, or blue axis) in the color space. Color component values are typically limited to integral amounts within a predetermined range, such as 0–255. For example, the red, green, and blue components of a pixel's color value may each be stored in a separate byte having a range of 0–255. The combination of red, green, and blue color component values for a particular pixel specify the coordinates of a point within the RGB space, and thereby specify the pixel's color. For example, a pixel having a red value of 127, a green value of 0, and a blue value of 255 specifies the color at coordinate (127, 0, 255) within the corresponding RGB color space. Typically, the value of a color component is proportional to the contribution of that color component to the color of the pixel. For example, a color having a large red component and small green and blue components will typically be rendered as predominantly red. Other color spaces may be encoded similarly. A variety of conventional techniques may be used for rendering a digital image on an output device such as a computer monitor or printer using appropriate colors represented according to a variety of color spaces.

Conventional digital cameras and other digital image acquisition devices may be used to acquire digital images from an image source, such as a printed page or a three-dimensional scene, and store the acquired image in a digital form as described above. For example, referring to FIG. 1, a conventional digital image acquisition system 100 includes a digital image capture system 102 that produces a captured digital image 104 from an original image 106. The original image 106 may be any source from which an image may be captured, such as a photograph, printed page, or real-life three-dimensional scene. The digital image capture system 102 (which may, for example, be a conventional digital camera), includes a conventional image acquisition device 108, such as a charge-coupled device (CCD) or complementary metal oxide semiconductor (CMOS) imager.

The image acquisition device 108 typically samples only a single color component (such as red, green, or blue) for each pixel in the captured digital image 104. This may be accomplished, for example, by superimposing a color filter pattern on the image acquisition device 108 so that only one color component (e.g., red, green, or blue) is sampled for each pixel in the captured digital image 104. As described in commonly owned U.S. Pat. No. 4,663,655 to Freeman, entitled "Method and Apparatus for Reconstructing Missing Color Samples," a color recovery algorithm 110 may be provided to recover the color components that are not sampled by the image acquisition device 108. The output of the image acquisition device 108 is provided to the color recovery algorithm 110 to provide the missing color components at each pixel. For example, if only the red component of a particular pixel was captured by the image acquisition device 108, the color recovery algorithm 108 attempts to provide the missing blue and green components for the pixel.

Before describing the digital image acquisition system of FIG. 1 in more detail, the phenomenon of aliasing will be briefly described. Consider an analog signal whose highest-frequency component has a frequency of $f_0$. As is well known to those of ordinary skill in the art, conversion of the analog signal into a digital signal by an analog-to-digital converter (ADC) typically involves sampling the analog signal at a frequency $f_1$ and quantizing the resulting samples. According to the Nyquist Theorem, accurate reconstruction of the original analog signal from the digital signal requires that the sampling frequency $f_1$ used by the ADC be greater than twice $f_0$. This minimum frequency ($2f_0$) required for accurate reconstruction of the original analog signal is commonly referred to as the Nyquist frequency or Nyquist rate.

If the original analog signal is sampled at a frequency lower than the Nyquist frequency, the reconstructed analog signal will contain signal components that were not present in the original analog signal. This phenomenon is referred to as aliasing, and the spurious signal components introduced by aliasing are referred to as aliasing artifacts.

Spurious low frequency sinusoidal signal components in the chrominance channel of the digital captured image 104 are one example of aliasing artifacts that may appear in the captured digital image 104. Such low-frequency sinusoidal components are typically produced by high frequencies in the original image 106 that are close to the Nyquist frequency and that are not sufficiently attenuated by an optical anti-aliasing filter 114 (described in more detail below). This kind of aliasing artifact typically manifests itself visually in the captured digital image 104 as spurious periodic color patterns that were not present in the original image 106.

A second kind of aliasing artifact may appear in the captured digital image 104 when a region of the original image 106 containing a sharp luminance boundary (such as black and white text) is sampled by the image acquisition device 108. Such sampling may introduce a phase difference between the red, green, and blue color components that appears as a spike or impulse in the chrominance channel of the captured digital image 104. This spike manifests itself visually in the captured digital image 104 as spurious color (also known as color fringes) in the vicinity of the region that contained the sharp luminance boundary in the original image 106.

Referring again to FIG. 1, the optical anti-aliasing filter 114 is typically provided between the original image 106 and the image acquisition device 108 in an attempt to attenuate aliasing artifacts such as those described above. The optical anti-aliasing filter 114 blurs the original image 106, such as by shifting the original image 106 by a small amount and superimposing the shifted image onto the original image 106 for delivery to the image acquisition device 108. An ideal anti-aliasing filter would eliminate from the original image 106 all spatial frequencies that are above the Nyquist frequency of the color filter pattern used by the image acquisition device 108. Actual anti-aliasing filters, however, typically only attenuate super-Nyquist signal components to varying degrees.

The visual effect of the optical anti-aliasing filter 114 is to blur the original image 106 for delivery to the image acquisition device 108. Conventional optical anti-aliasing filters are designed to zero the Nyquist frequency of the color filter pattern in the original image. However, these filters do not completely eliminate super-Nyquist frequencies because of the side-lobes that are present in their frequency response. Furthermore, the sub-Nyquist frequencies are also attenuated in this process, resulting in blurring in the captured image 104 that has aliasing artifacts. To reduce the hit in sharpness, some digital cameras employ optical anti-aliasing filters that cause less blur by expanding the filter's pass band beyond the Nyquist frequency. Although such filters produce less blur, they also cannot effectively attenuate super-Nyquist frequencies. When conventional color recovery algorithms are applied to anti-aliased images produced using such filters, the aliasing artifacts in the captured digital image 104 manifest themselves as color fringes and other visual imperfections.

When conventional optical anti-aliasing filters are used, there is a marked tradeoff between image sharpness and presence of aliasing artifacts. Stronger anti-aliasing filters reduce more aliasing artifacts at the expense of image sharpness. Although weaker anti-aliasing filters maintain more image sharpness, they attenuate fewer aliasing artifacts.

What is needed, therefore, is a system for attenuating aliasing artifacts without significantly affecting image sharpness.

SUMMARY

In one aspect, the present invention provides a multi-resolution filter that may be used to attenuate aliasing artifacts in a digital input signal, such as a digital image acquired by a digital camera. The multi-resolution filter reduces the resolution of the digital input signal and filters the reduced resolution signal using a median filter. The output of the median filter is provided to an interpolation filter, which increases the resolution of the median filter's output to produce a digital output signal in which aliasing artifacts from the digital input signal have been attenuated. The multi-resolution filter may be advantageously applied to digital images to attenuate aliasing artifacts without undesirably blurring sharp color boundaries in the digital image. Furthermore, the computational expense associated with the median filter is diminished by reducing the resolution of the digital input signal before filtering it using the median filter.

The resolution of the digital input signal may be reduced by performing linear low-pass filtering on the digital input signal to produce a filtered digital input signal, and by down-sampling the filtered digital input signal to produce the reduced resolution signal. The interpolation filter may include an up-sampler to the increase the rate by introducing zero-samples in between the original samples of the filtered reduced resolution signal, followed by a linear low-pass filter to produce the digital output signal. The linear low-pass filter may, for example, be a low-pass filter for use in bi-cubic interpolation. The down-sampling factor of the down-sampler may be the same as the up-sampling factor of the up-sampler, and the support of the linear filter may be the same as the down-sampling factor and the up-sampling factor. The digital input signal may be a chrominance channel of a digital image.

In one embodiment, a multi-resolution filtering system is provided to produce a second digital image from a first digital image. The first digital image includes a luminance signal, a first chrominance signal, and a second chrominance signal. The second digital image includes the luminance signal, a first filtered chrominance signal, and a second filtered chrominance signal. The multi-resolution filtering system uses a first multi-resolution filter, as described above, to filter the first chrominance signal of the first digital image to produce the first filtered chrominance signal. The multi-resolution filtering system uses a second multi-resolution filter, as described above, to filter the second chrominance signal of the first digital image to produce the second filtered chrominance signal. The multi-resolution filtering system may also perform filtering on digital images encoded according to various color spaces by performing appropriate color space conversions prior to and subsequent to filtering.

A variety of other features and advantages of various embodiments of the present invention will become apparent from the following description and from the claims.

DETAILED DESCRIPTION

In one aspect, the present invention provides a multi-resolution filter that may be used to attenuate aliasing artifacts in a digital input signal, such as a digital image acquired by a digital camera. The multi-resolution filter reduces the resolution of the digital input signal and filters the reduced resolution signal using a median filter. The output of the median filter is provided to an interpolation filter, which increases the resolution of the median filter's output to produce a digital output signal in which aliasing artifacts from the digital input signal have been attenuated. The multi-resolution filter may be advantageously applied to digital images to attenuate aliasing artifacts without undesirably blurring sharp color or luminance boundaries in the digital image. Furthermore, the computational expense associated with the median filter is diminished by reducing the resolution of the digital input signal before filtering it using the median filter.

A variety of other features and advantages of various embodiments of the present invention will be described in more detail below.

Figure 1:
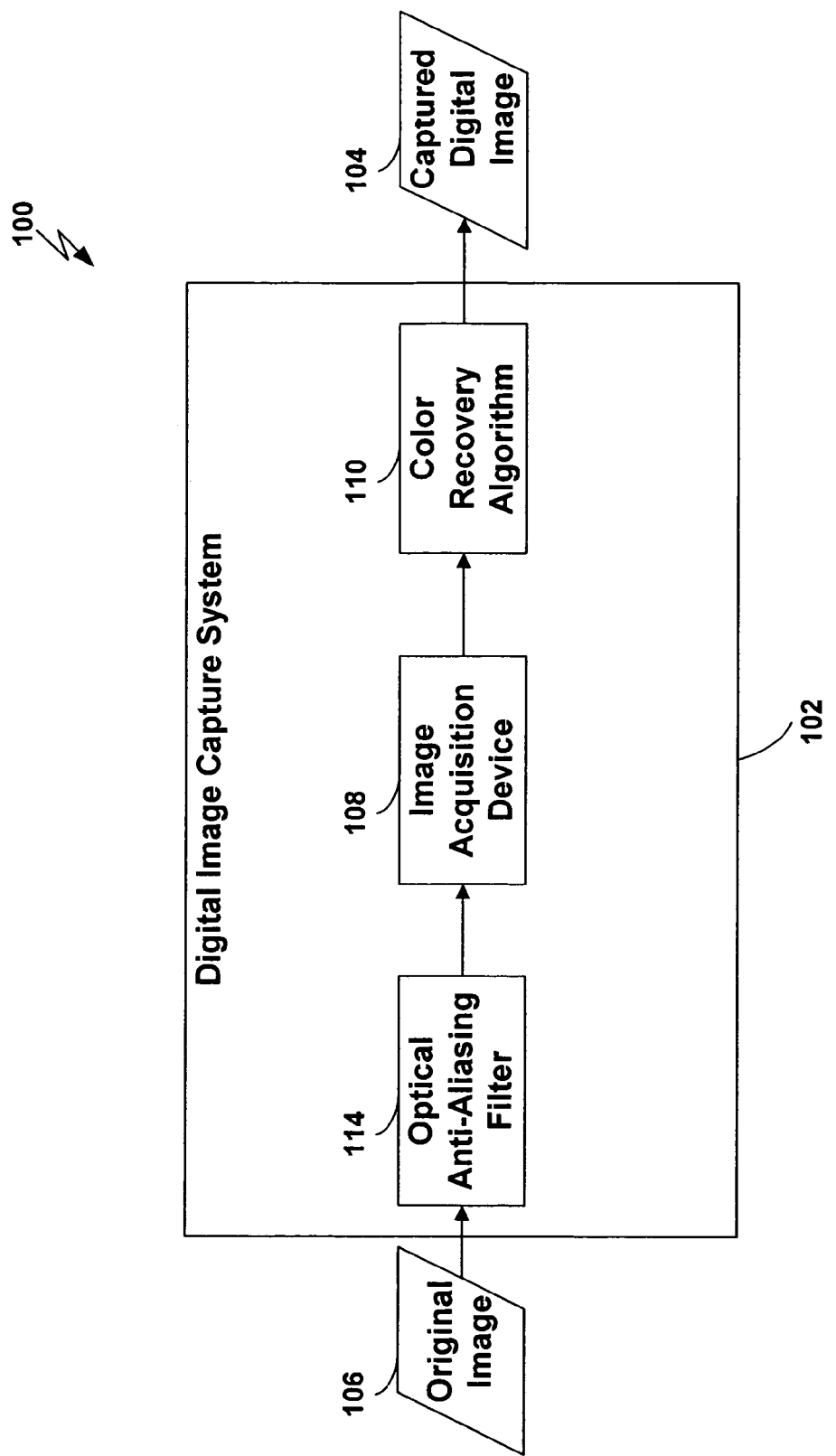
FIG. 1 is a block diagram of a prior art digital image acquisition system.
Figure 2:
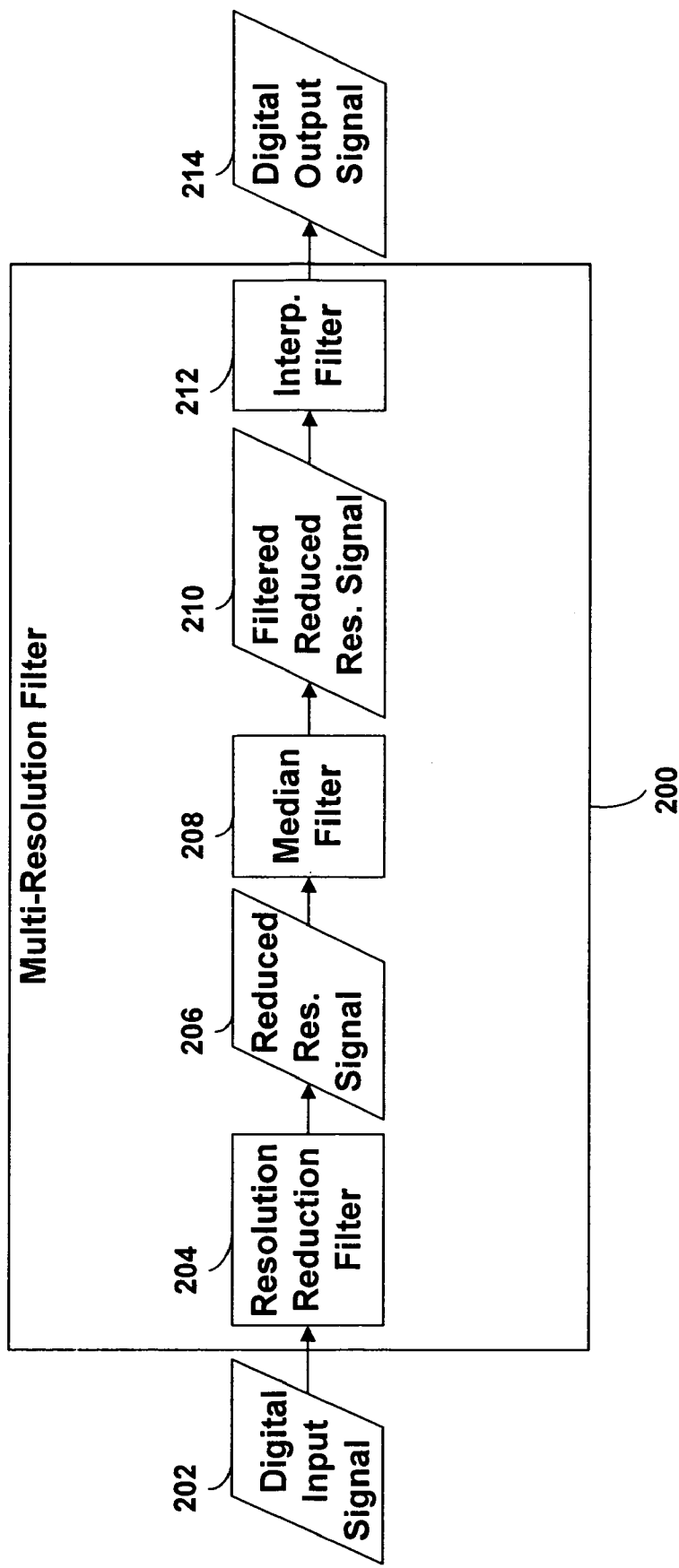
FIG. 2 is a block diagram of a multi-resolution filter according to one embodiment of the present invention.

Referring to FIG. 2, a multi-resolution filter 200 according to one embodiment of the present invention is shown. A digital input signal 202 is provided as an input to the multi-resolution filter 200. The digital input signal 202 may be any digital signal, such as a chrominance channel of the captured digital image 104 produced by the digital image capture system 102 (FIG. 1). The multi-resolution filter 200 includes a resolution reduction filter 204 that reduces the resolution of the digital input signal 202 (e.g., by down-sampling) to produce a reduced resolution signal 206. As a result of the filtering performed by the resolution reduction filter 204, the reduced resolution signal 206 contains fewer data samples than the digital input signal 202. The multi-resolution filter 200 also includes a median filter 208 to produce a filtered reduced resolution signal 210 by median filtering the reduced resolution signal 206.

The median filter 208 may be any median filter. In one embodiment of the present invention, the median filter 208 operates as follows. For any one sample in the input signal (e.g., the reduced resolution signal 206), the median filter 208 computes the median of its n neighboring samples and replaces the sample value with the median value. The value n is referred to as the "support" of the median filter 208. As used herein, the term "median filtering" refers to the process of applying a median filter to a signal.

The multi-resolution filter 200 also includes an interpolation filter 212 to produce a digital output signal 214 by interpolating the filtered reduced resolution signal 210.

It should be appreciated that the multi-resolution filter 200 reduces the resolution of the digital input signal 202, using the resolution reduction filter 204, to provide the median filter 208 with an input signal (i.e., the reduced resolution signal 206) that has fewer data samples than the digital input signal 202 and that may therefore be filtered at less computational expense by the median filter 208. As described in more detail below, this advantageously enables the multi-resolution filter 200 to provide the aliasing artifact attenuation properties of the median filter 208 without incurring the computational expense that would be incurred by applying the median filter 208 to the entire digital input signal 202. Through application of the median filter 208 and the interpolation filter 212, aliasing artifacts in the digital input signal 202 may be attenuated without appreciable loss of information (such as image sharpness in the case of a digital image).

Figure 3:
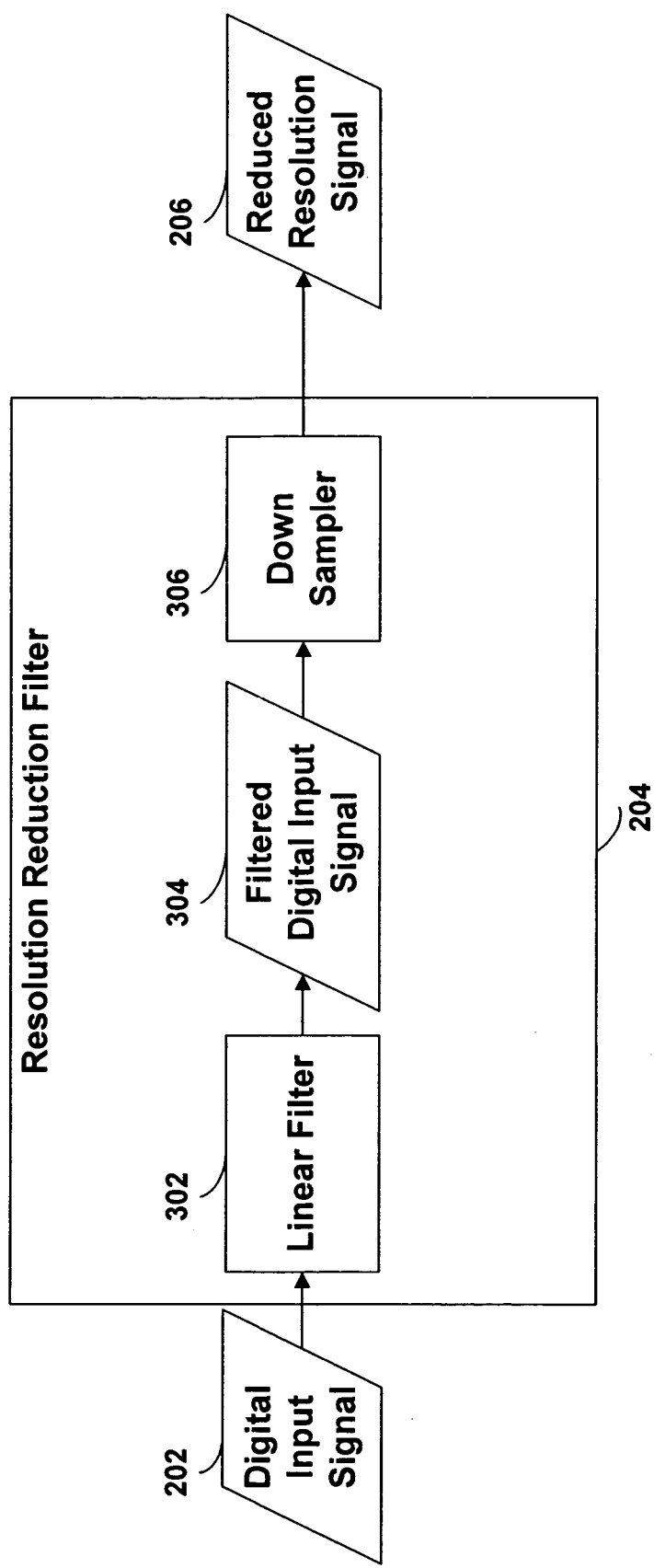
FIG. 3 is a block diagram of a resolution reduction filter according to one embodiment of the present invention.

The resolution reduction filter 204 may be implemented in any of a variety of ways to reduce the resolution of the digital input signal 202 and thereby to produce the reduced resolution signal 206. For example, referring to FIG. 3, in one embodiment the resolution reduction filter 204 is implemented as follows. The resolution reduction filter 204 includes a linear filter 302. The linear filter 302 filters the digital input signal 202 to produce a filtered digital input signal 304. The resolution reduction filter 204 also includes a down-sampler 306 to down-sample the filtered digital input signal 304 and thereby to produce the reduced resolution signal 206.

The linear filter 302 may be implemented in any of a variety of ways. For example, the linear filter 302 may be a low-pass linear filter, such as a mean filter (a low-pass linear filter having a rectangular impulse response). As used herein, the term "mean filtering" refers to the process of applying a mean filter to a signal. The down-sampler 306 may be implemented in any of a variety of ways. For example, the down-sampler 306 may be configured to discard all but one out of every nth data point in the filtered digital input signal 304, where n is selected to achieve a desired down-sampling rate.

Figure 4:
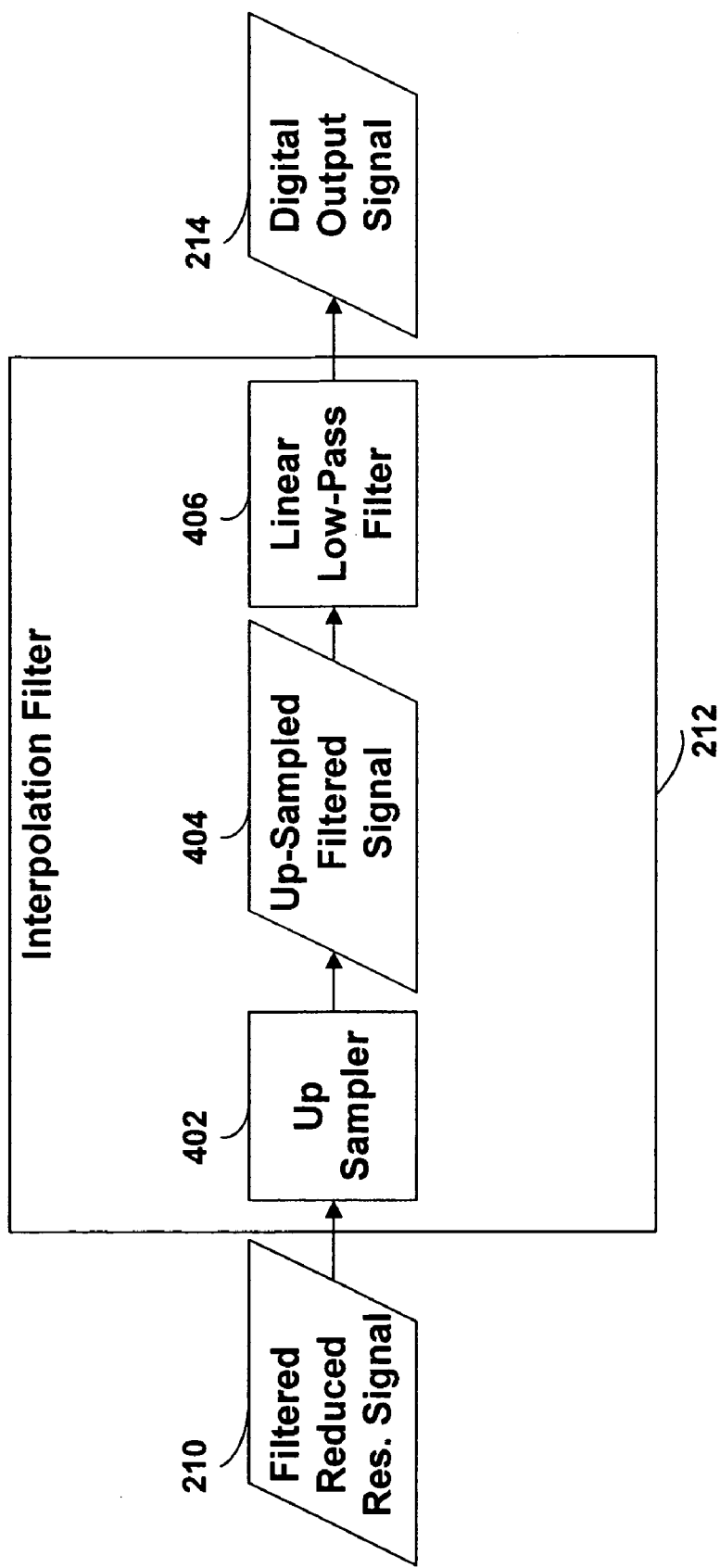
FIG. 4 is a block diagram of an interpolation filter according to one embodiment of the present invention.

In general, the interpolation filter 212 increases the number of data points in the filtered reduced resolution signal 210 to produce the digital output signal 214. The interpolation filter 212 may be implemented in any of a variety of ways to employ any of a variety of interpolation methods. For example, referring to FIG. 4, the interpolation filter 212 may include an up-sampler 402 to produce an up-sampled filtered signal 404 by up-sampling the filtered reduced resolution signal 210. The up-sampler 402 may up-sample the filtered reduced resolution signal 210 by, for example, inserting n zeros between each data point in the filtered reduced resolution signal 210, where n corresponds to the desired up-sampling rate. The interpolation filter 212 also includes a linear low-pass filter 406 (e.g., a low-pass filter used in bi-cubic interpolation) that produces the digital output signal 214 by filtering the up-sampled filtered signal 404.

In one embodiment, the resolution reduction filter 204 is implemented as shown and described above with respect to FIG. 3, the interpolation filter 212 is implemented as shown and described above with respect to FIG. 4, the linear filter 302 has a support (i.e., impulse response length) of dec, the down-sampling rate of the down-sampler 306 is equal to dec, and the up-sampling rate of the up-sampler 402 is equal to dec. As a result, the digital input signal 202 and the digital output signal 214 have the same resolution.

The multi-resolution filter 200 may be used in a variety of applications. For example, referring to FIG. 5, a multi-resolution filtering system 500 is shown in which the multi-resolution filter 200 is applied to the chrominance channels of a digital image (such as the captured digital image 104 produced by the digital image capture system 102 shown in FIG. 1) to attenuate aliasing artifacts in the chrominance channels.

The multi-resolution filtering system 500 filters a first digital image 506 (which may, for example, be the captured digital image 104 shown in FIG. 1) to produce a second digital image 514. The first digital image 506 is represented according to a luminance-chrominance color space, and therefore includes a luminance signal 508, a first chrominance signal 510, and a second chrominance signal 512. Similarly, the second digital image 514 includes a luminance signal 516, a first chrominance signal 518, and a second chrominance signal 520. The multi-resolution filtering system 500 receives the luminance signal 508 of the first digital image 508, and transmits the luminance signal 508 along a wire 505 or other signal transmission means to provide the luminance signal 508 of the first digital image 508 as the luminance signal 516 of the second digital image 514.

The multi-resolution filtering system 500 includes multi-resolution filters 502 and 504 that are each constructed and arranged as described and shown above with respect to FIG. 2. The multi-resolution filter 502 filters the first chrominance signal 510 of the first digital image 506 to produce the first chrominance signal 518 of the second digital image 514. Similarly, the multi-resolution filter 504 filters the second chrominance signal 512 of the first digital image 506 to produce the second chrominance signal 520 of the second digital image 514. The multi-resolution filter system 500 thereby attenuates aliasing artifacts in the first and second chrominance signals 510 and 512 of the first digital image 506 by applying the multi-resolution filters 502 and 504 to the chrominance signals 510 and 512, respectively.

Figure 5:
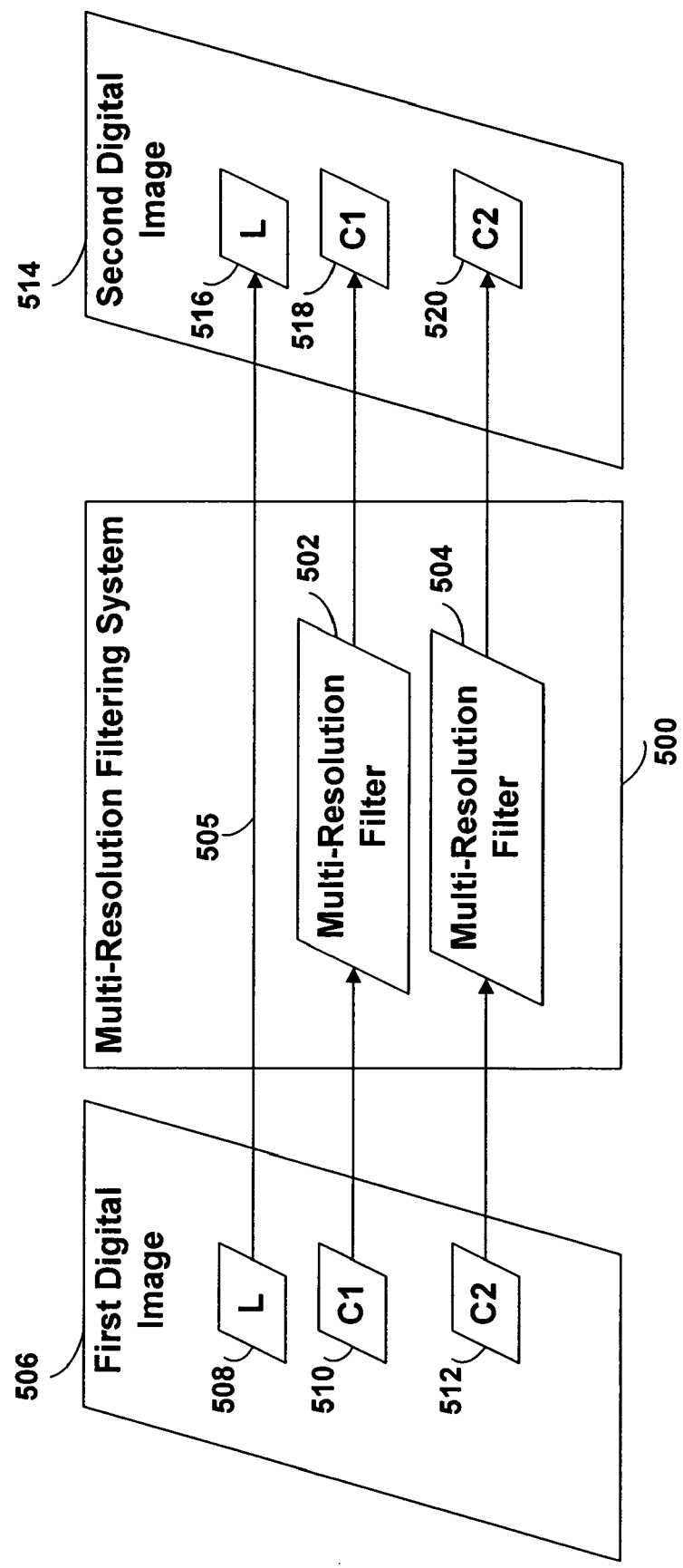
FIG. 5 is a block diagram of a multi-resolution filtering system according to one embodiment of the present invention.
Figure 6:
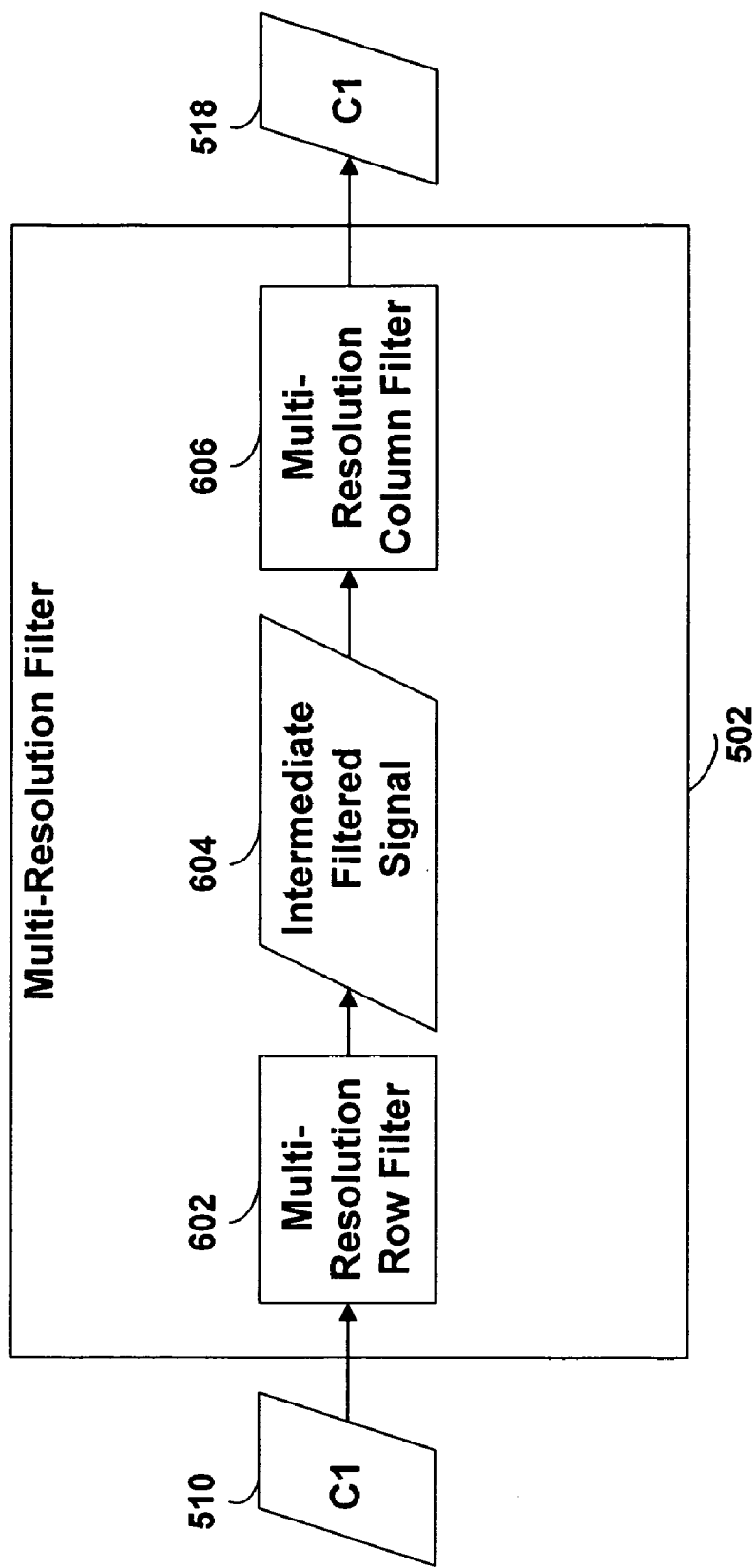
FIG. 6 is a block diagram of a multi-resolution filter according to one embodiment of the present invention.

It should be appreciated that as shown in FIG. 5, if the first digital image 506 is a two-dimensional image, the first chrominance signal 510 and the second chrominance signal 512 will each be two-dimensional signals, in which case the multi-resolution filter 502 and the multi-resolution filter 504 may each be two-dimensional filters. More generally, the multi-resolution filter 200 may be implemented as an n dimensional filter, where n is any integer greater than or equal to one, using techniques that are well known to those of ordinary skill in the art. For example, referring to FIG. 6, a two-dimensional embodiment of the multi-resolution filter 502 is shown. The multi-resolution filter 502 includes a one-dimensional multi-resolution row filter 602, constructed and arranged as shown and described above with respect to FIG. 2, to produce an intermediate filtered signal 604 by filtering the rows of the first chrominance signal 510. The multi-resolution filter 502 also includes a one-dimensional multi-resolution column filter 606, constructed and arranged as shown and described above with respect to FIG. 2, to produce the first chrominance signal 518 of the second digital image 514 by filtering the columns of the intermediate filtered signal 604. It should be appreciated that the multi-resolution filter 504 shown in FIG. 5 may be implemented as a two-dimensional filter in a similar manner.

More generally, if the digital input signal 202 to the multi-resolution filter 200 has a dimension of n, the multi-resolution filter 200 may be implemented as any combination of multi-resolution filters having a combined effective dimension of n. For example, if the digital input signal 202 is a three-dimensional signal, the multi-resolution filter 200 may be implemented as a single three-dimensional multi-resolution filter, a combination of a two-dimensional multi-resolution filter and a one-dimensional multi-resolution filter, or a combination of three multi-resolution filters.

Figure 7:
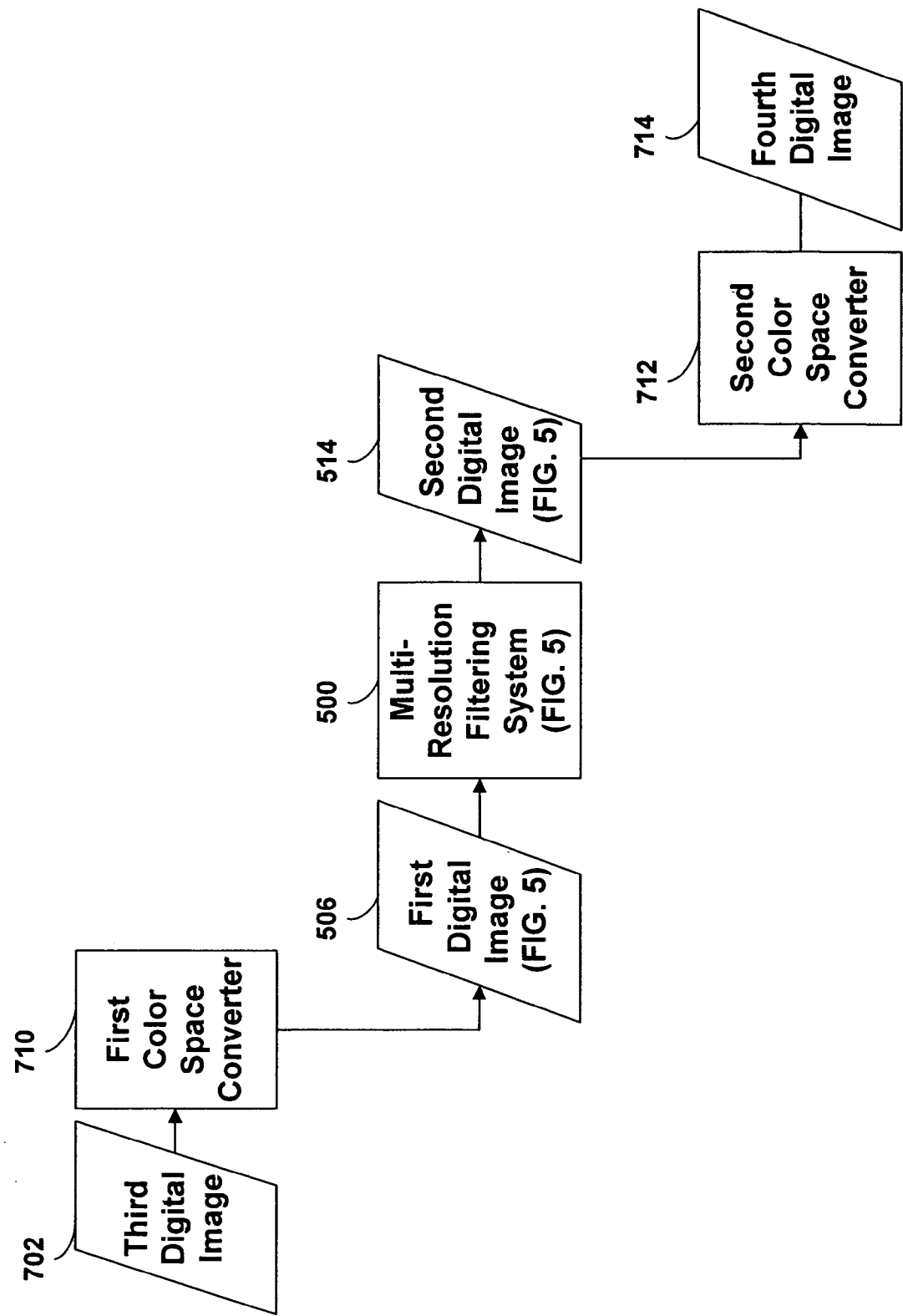
FIG. 7 is a block diagram of a multi-resolution filtering system according to one embodiment of the present invention.

Returning to FIG. 5, the first digital image 506 and the second digital image 514 are both represented according to a luminance-chrominance color space. The multi-resolution filtering system 500 may attenuate aliasing artifacts in digital images that are represented according to other color spaces using, for example, the embodiment shown in FIG. 7. Referring to FIG. 7, a third digital image 702 is represented according to a third color space. The third digital image 702 includes signals corresponding to color components in the third color space. For example, if the third digital image 702 is represented according to an RGB color space, the third digital image 702 includes red, green, and blue signals. The third digital image 702 is provided to a first color space converter 710, which converts the third digital image 702 into the first digital image 506 (FIG. 5) using an appropriate color space transformation.

The first digital image 506 is filtered by the multi-resolution filtering system 500 to produce the second digital image 514 as described and shown above with respect to FIG. 5. A second color space converter 712 converts the second digital image 514 into a fourth digital image 714, represented according to a fourth color space, using an appropriate color space transformation.

It should be appreciated that the third digital image 702 and the fourth digital image 714 each may be represented according to any color space. It should therefore be appreciated that the first color space converter 710 may convert from any color space in which the third digital image 702 is represented into the luminance-chrominance color space in which the first digital image 506 is represented, and that the second color space converter 712 may convert from the luminance-chrominance color space in which the second digital image 514 is represented into any color space in which the fourth digital image 714 is represented.

Figure 8A:
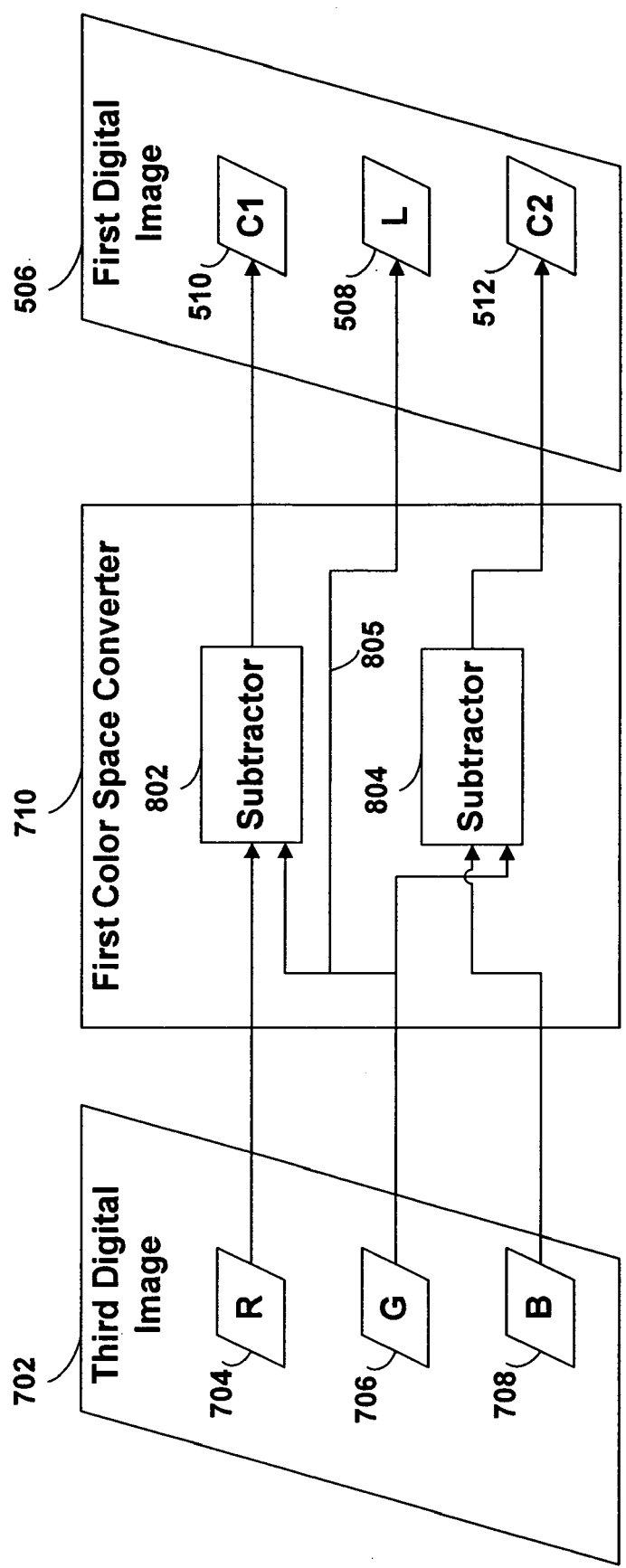
FIGS. 8A–8B are block diagrams of color space converters according to one embodiment of the present invention.
Figure 8B:
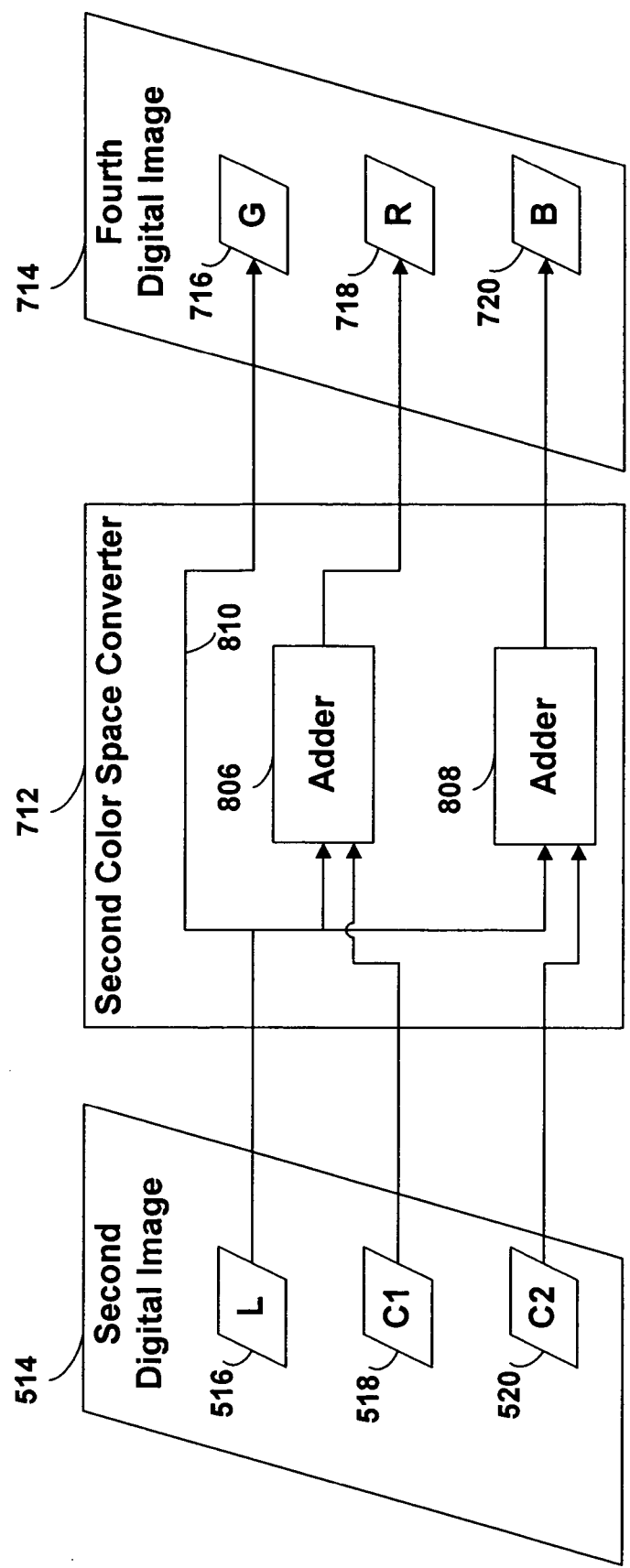

The first color space converter 710 and the second color space converter 712 may perform color space conversions in any manner. FIGS. 8A and 8B illustrate particular embodiments of the first color space converter 710 and the second color space converter 712, respectively. Referring to FIG. 8A, in one embodiment the third digital image 702 is represented according to an RGB color space and thereby includes a first red signal 704, a first green signal 706, and a first blue signal 708. The first color space converter 710 includes a first subtractor 802 and a second subtractor 804. The first subtractor 802 receives as inputs the first red signal 704 and the first green signal 706, and subtracts the first green signal 706 from the first red signal 704 to produce the first chrominance signal 510 of the first digital image 506. The second subtractor 804 receives as inputs the first blue signal 708 and the first green signal 706, and subtracts the first green signal 706 from the first blue signal 708 to produce the second chrominance signal 512 of the first digital image 506. The first color space converter 710 transmits the first green signal 706 along a wire 805 or other signal transmission means to provide the first green signal 706 as the luminance signal 508 of the first digital image 506.

Referring to FIG. 8B, in one embodiment the fourth digital image 714 is represented according to an RGB color space and thereby includes a second red signal 718, a second green signal 716, and a second blue signal 720. The second color space converter 712 includes a first adder 806 and a second adder 808. The first adder 806 receives as inputs the luminance signal 516 and the first chrominance signal 518 of the second digital image 514, and adds the luminance signal 516 to the first chrominance signal 518 to produce the second red signal 718. The second adder 808 receives as inputs the luminance signal 516 and the second chrominance signal 520 of the second digital image 514, and adds the luminance signal 516 to the second chrominance signal 520 to produce the second blue signal 720. The second color space converter 712 transmits the luminance signal 516 along a wire 805 or other signal transmission means to provide the luminance signal 516 of the second digital image 514 as the second green signal 716.

The embodiments of the first color space converter 710 and the second color space converter 712 described and shown above with respect to FIGS. 8A–8B provide a straightforward and computationally efficient way to convert between luminance-chrominance and RGB color spaces.

Having described some general features of various embodiments of the present invention, various embodiments of the present invention and advantages thereof will now be described in more detail.

Figure 9:
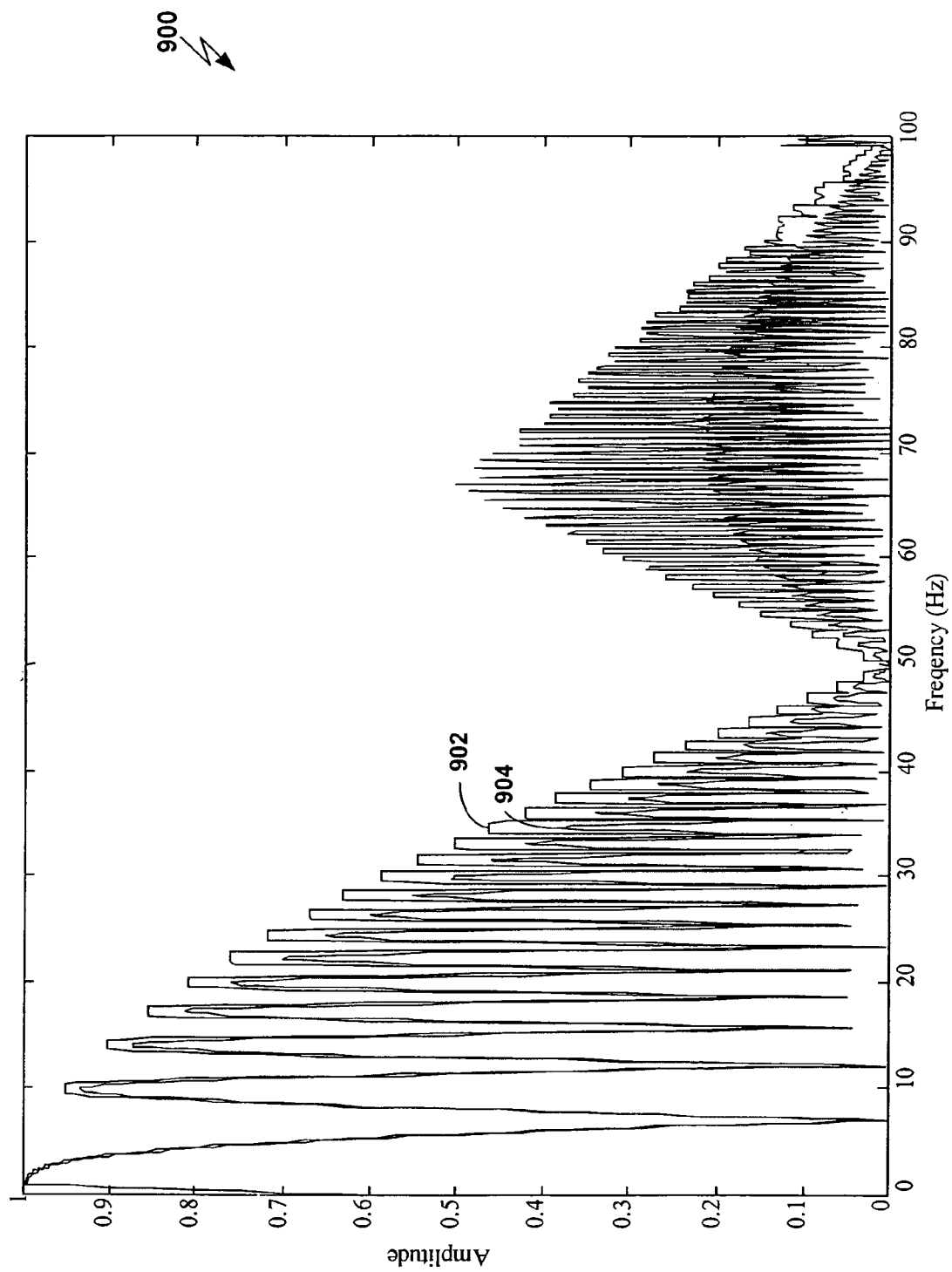
FIG. 9 is a graph generally illustrating the frequency responses of a conventional mean filter and a conventional median filter to sinusoidal signals of various frequencies.

As described above, the median filter 208 included in the multi-resolution filter 200 (FIG. 2) may be advantageously used to attenuate aliasing artifacts in a digital image without appreciably affecting the sharpness of the image. This feature of the median filter 208 and its operation within the multi-resolution filter 200 will now be described in more detail. Referring to FIG. 9, a graph 900 generally illustrates the frequency response of a mean filter and a median filter (such as the median filter 208) to sinusoidal signals of varying frequencies. The horizontal axis of the graph 900 represents the frequency of the filtered signals and the vertical axis represents the amplitude of the filtered output. Plot 902 represents the frequency response of a median filter having a support of 20 pixels, and plot 904 represents the frequency response of a mean filter having a support of 20 pixels. It should be appreciated that the plots 902 and 904 illustrate the general contours of the frequency responses of the median filter and the mean filter, respectively, and are not intended to provide precise representations of such frequency responses.

Based on the plots 902 and 904, it should be appreciated that the frequency responses of the mean filter and median filters are similar, particularly for frequencies less than 50 Hz, with the frequency response of the median filter having somewhat larger side-lobes than those of the mean filter.

Thus, it should further be appreciated that the result of using a median filter (such as the median filter 208) to filter (and thereby attenuate aliasing artifacts in) low-frequency sinusoidal signals (such as those appearing as aliasing artifacts in digital images) is substantially similar to the result of using a mean filter to filter such signals. Mean and median filters also behave similarly in response to signal spikes or impulses. However, the median filter is more effective in removing an impulse than a mean filter.

On the other hand, mean filters and median filters respond very differently to square waves. For example, referring to FIG. 10, a graph 900 shows a plot of a square wave signal 1002. The horizontal axis of the graph 1000 represents a span of pixels, and the vertical axis of the graph 1000 represents signal amplitude. A plot 1004 represents the output of a median filter having a support of 20 pixels when provided with the square wave signal 1002 as an input. A plot 1006 represents the output of a mean filter having a support of 20 pixels when provided with the square wave signal 1002 as an input. It should be appreciated that the plots 1004 and 1006 illustrate the general contours of the outputs of the median filter and the mean filter, respectively, and are not intended to provide precise representations of such outputs.

It should be appreciated that the plot 1004 (representing the output of the median filter) corresponds very closely to the plot 1002 of the square wave. In contrast, it should be appreciated that the plot 1006 (representing the output of the mean filter) differs substantially from the plot 1002 of the square wave over a substantial span of pixels. As a result, if the mean filter were applied to a chrominance channel of a digital image, the mean filter would undesirably blur sharp color boundaries in the chrominance channel. If it were necessary to increase the support of the mean filter to attenuate very low frequency sinusoidal signals, the blurring of sharp color boundaries by the mean filter would be even more significant than that shown in FIG. 10.

Figure 10:
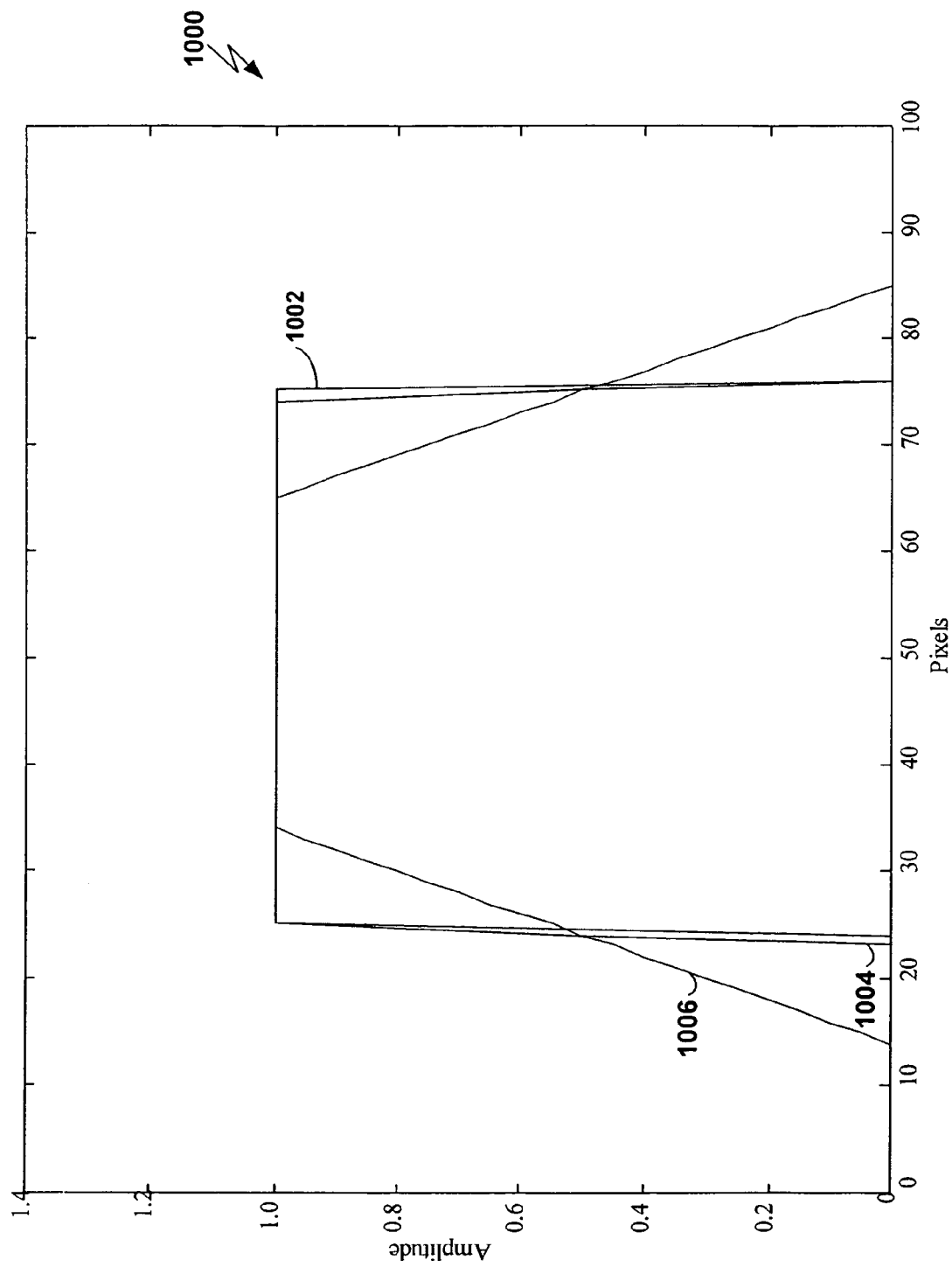
FIG. 10 is a graph generally illustrating the response of a conventional mean filter and a conventional median filter to a square wave.

It should be appreciated from FIGS. 9 and 10 that the median filter 208 has two properties that are advantageous for an aliasing artifact attenuation filter: (1) the median filter 208 is capable of attenuating aliasing artifacts in the form of low-frequency sinusoids and spikes or impulses, and (2) the median filter 208 does not substantially smooth the edges of square waves. As a result, the median filter 208 may be advantageously used to attenuate aliasing artifacts in digital images without substantially reducing image sharpness.

Conventional median filters, however, are typically computationally intensive. Furthermore, current implementations of large-support median filters are not as efficient as corresponding large-support mean filters that can be implemented in the frequency domain.

The multi-resolution filter 200 shown in FIG. 2 provides advantages provided by a median filter—attenuation of aliasing artifacts without substantial loss of image sharpness—with lower computational requirements than that of a median filter. As described above, this combination of advantages is achieved by: (1) applying the median filter 208 to a reduced data set by reducing the resolution of the digital input signal 202, and (2) increasing the resolution of the output of the median filter 208 using the interpolation filter 212.

Figure 11:
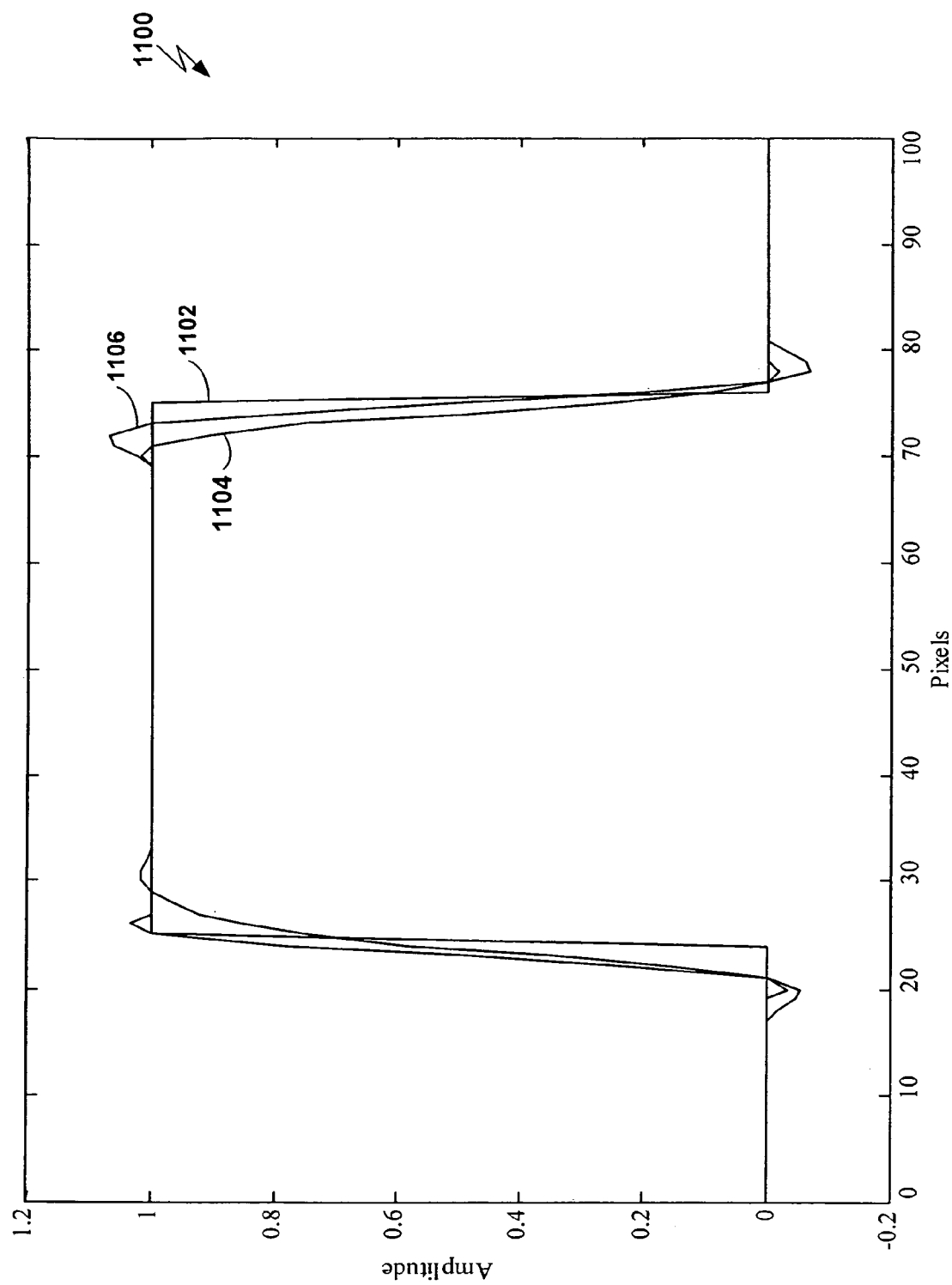
FIG. 11 is a graph generally illustrating the responses of various embodiments of the multi-resolution filter described herein to a square wave input.

More specifically, the multi-resolution filter 200 has an effective support of dec*len, where dec is the resolution reduction factor of the resolution reduction filter 204 and len is the support of the median filter 208. The computational requirements of the multi-resolution filter 200 may therefore be increased or decreased by modifying the values of dec and len in any manner, so long as dec is greater than one. Referring to FIG. 11, a graph 1100 generally illustrates the response of the multi-resolution filter 200 on a square pulse 1102. The horizontal axis of the graph 1100 represents a span of pixels and the vertical axis represents the signal amplitude. A plot 1104 corresponds to the output of the multi-resolution filter 200 when dec is two and len is ten. A plot 1106 corresponds to the output of the multi-resolution filter 200 when dec is four and len is five. It should be appreciated that the plots 1104 and 1106 illustrate the general contours of the outputs of the multi-resolution filter 200 and are not intended to provide precise representations of outputs.

As shown in FIG. 11, loss in image sharpness resulting from the use of the multi-resolution filter 200 is minimal despite the significant decrease in computation required compared to a conventional median filter used in isolation, even when dec is equal to four. Furthermore, when the multi-resolution filter 200 is applied to the chrominance channels (as shown in FIG. 5) of a digital image (such as the first digital image 506), the visible degradation is minimal because the human eye is less sensitive to sharpness information in the chrominance channels than in the luminance channel.

The computational requirements of the multi-resolution filter 200 and the savings as compared to a conventional median filter are now described in more detail. Let the support of a conventional median filter, such as the median filter 208, be M elements. One way to compute the median of a dataset is to sort the M elements into ascending or descending order and to select the center element as the median of the dataset. Sorting the elements, however, is computationally intensive since conventional sorting algorithms involve on the order of $M^2$ or $M \cdot \log M$ operations, depending on the particular sorting algorithm employed. There are other algorithms that can compute the median in linear time. We will assume that some such algorithm is used in our comparison. Assume that the median computation requires on the order of $A \cdot M$ operations, where A is a constant that depends on the choice of the particular algorithm.

Let N be the total number of pixels in the input image (e.g., the first digital image 506). In one embodiment, the linear filter 302 (FIG. 3) has a support of dec, and the down-sampler 306 retains only N/dec samples from its input. Using these parameters, the combined operation of the linear filter 302 and the down-sampler 306 involves a total of dec·(N/dec)=N operations. Assume further that in this embodiment, the median filter 208 has a support of len. The median filter 208 therefore performs A·len·(N/dec) operations, since the median filter 208 only operates on N/dec samples.

The number of operations performed by the interpolation filter 212 depends on the support of the interpolation filter 212. If, for example, the interpolation filter 212 performs linear interpolation, then the support of the interpolation filter 212 is two pixels. If the interpolation filter 212 performs bi-cubic interpolation, then the support of the interpolation filter 212 is four pixels. Since the final image (e.g., the second digital image 514) has (N−N/dec) interpolated pixels, the number of operations for bi-cubic interpolation is given by (4·N·(dec−1))/dec operations. The total complexity, C, of the multi-resolution filter 200, is therefore given as:

$$C = N \cdot (5 + (A \cdot \text{len} - 4)/\text{dec}) \quad \text{(Equation 1)}$$

The total complexity of a conventional median filter of support dec·len, $C_c$, is given as:

$$C_c = N \cdot A \cdot \text{dec} \cdot \text{len} \quad \text{(Equation 2)}$$

Let S be the number of times the multi-resolution filter 200 is faster than the conventional median filter. Then, from Equation 1 and Equation 2, we obtain:

$$S = \left( \frac{A \cdot \text{len}}{5 \cdot \text{dec} + A \cdot \text{len} - 4} \right) \cdot \text{dec}^2. \quad \text{(Equation 3)}$$

Note that the computational savings increase with increasing dec.

As described above, the multi-resolution filter 200 and the multi-resolution filtering system 500 may be used to filter the captured digital image 104 shown in FIG. 1. It should be appreciated, however, that the multi-resolution filter 200 may be used to filter any digital signal and that the multi-resolution filtering system 500 may be used to filter any digital image. Furthermore, when the multi-resolution filtering system 500 is used in conjunction with a digital image capture system, such as the digital image capture system 102 shown in FIG. 1, the digital image capture system 102 may be constructed and arranged differently than shown in FIG. 1. For example, the digital image capture system 102 need not include the optical anti-aliasing filter 114 or the color recovery algorithm 110. For example, some digital image acquisition systems capture all colors in the original image 106 and therefore do not require a color recovery algorithm. Furthermore, the optical anti-aliasing filter 114 and the color recovery algorithm 110, if included in the digital image capture system 102, may be selected and/or constructed in any manner to perform their respective functions.

The techniques described above may be implemented, for example, in hardware, software, firmware, or any combination thereof. The techniques described above may be implemented in one or more computer programs tangibly embodied in a machine-readable storage device for execution by a computer processor. Any computer program used to implement any aspect of the present invention may be implemented in any programming language, such as assembly language, machine language, a high-level procedural programming language, or an object-oriented programming language. The programming language may be a compiled or interpreted programming language.

Suitable processors for implementing aspects of the invention include, by way of example, both general and special purpose microprocessors. Generally, the processor receives instructions and data from a read-only memory and/or a random access memory. Storage devices suitable for tangibly embodying computer program instructions include, for example, all forms of non-volatile memory, such as semiconductor memory devices, including EPROM, EEPROM, and flash memory devices; magnetic disks such as internal hard disks and removable disks; magneto-optical disks; and CD-ROMs. Any of the foregoing may be supplemented by, or incorporated in, specially-designed ASICs (application-specific integrated circuits). A computer can generally also receive programs and data from a storage medium such as an internal disk (not shown) or a removable disk. These elements will also be found in a conventional desktop or workstation computer as well as other computers suitable for executing computer programs implementing the methods described herein, which may be used in conjunction with any digital print engine or marking engine, display monitor, or other raster output device capable of producing color or gray scale pixels on paper, film, display screen, or other output medium.

Aspects of the present invention has been described in terms of embodiments. The invention, however, is not limited to the embodiments depicted and described. Rather, the scope of the invention is defined by the claims, and other embodiments are within the scope of the following claims.

What is claimed is:

1. A method for filtering a digital input signal to produce a digital output signal, the method comprising steps of:
   (A) reducing a resolution of the digital input signal to produce a reduced resolution signal by steps comprising;
      (A)(1) performing linear filtering on the digital input signal to produce a filtered digital input signal; and
      (A)(2) down-sampling the filtered digital input signal to produce the reduced resolution signal;
   (B) performing median filtering on the reduced resolution signal to produce a filtered reduced resolution signal; and
   (C) performing interpolation on the filtered reduced resolution signal to produce the digital output signal.

2. The method of claim 1, wherein the step (A)(1) comprises a step of performing linear low-pass filtering on the digital input signal.

3. The method of claim 2, wherein the step of performing linear low-pass filtering on the digital input signal comprises a step of performing mean filtering on the digital input signal.

4. The method of claim 1, wherein the step (C) comprises steps of:
   (C)(1) up-sampling the filtered reduced resolution signal to produce an up-sampled filtered signal; and
   (C)(2) performing linear low-pass filtering on the up-sampled filtered signal to produce the digital output signal.

5. The method of claim 4, wherein the step (C) (2) comprises a step of performing low-pass filtering using a linear low-pass filter for use in bi-cubic interpolation to produce the digital output signal.

6. The method of claim 1, wherein the digital input signal comprises a signal corresponding to a chrominance channel of a digital image.

7. The method of claim 1, wherein the digital input signal comprises a two-dimensional signal.

8. A method for producing a second digital image from a first digital image, the first digital image including a luminance signal, a first chrominance signal, and a second chrominance signal, the second digital image including the luminance signal, a first filtered chrominance signal, and a second filtered chrominance signal, the method comprising steps of:
   (A) filtering the first chrominance signal of the first digital image according to the method of claim 1 to produce the first filtered chrominance signal; and (B) filtering the second chrominance signal of the first digital image according to the method of claim 1 to produce the second filtered chrominance signal.

9. The method of claim 8, wherein the first digital image is encoded according to a first color space, and wherein the method further comprises a step of:
   (C) converting a third digital image encoded according to a second color space into the first digital image.

10. The method of claim 9, wherein the first color space comprises a luminance-chrominance color space, and wherein the second color space comprises an RGB color space.

11. The method of claim 10, wherein the step (C) comprises steps of:
   (C)(1) subtracting a green color signal of the third digital image from a red color signal of the third digital image to produce the first chrominance signal of the first digital image;
   (C)(2) subtracting the green color signal of the third digital image from a blue color signal of the third digital image to produce the second chrominance signal of the first digital image; and
   (C)(3) providing the green color signal as the luminance signal of the first digital image.

12. The method of claim 9, further comprising a step of:
   (D) converting the second digital image into a fourth digital image encoded according to a third color space.

13. The method of claim 12, wherein the first color space comprises a luminance-chrominance color space, and wherein the third color space comprises an RGB color space.

14. The method of claim 13, wherein the step (D) comprises steps of:
   (D)(1) adding the first filtered chrominance signal to the luminance signal to produce a red color signal of the fourth digital image;
   (D)(2) adding the second filtered chrominance signal to the luminance signal to produce a blue color signal of the fourth digital image; and
   (D) (3) providing the luminance signal as a green color signal of the fourth digital image.

15. An apparatus for producing a second digital image from a first digital image, the first digital image including a luminance signal, a first chrominance signal, and a second chrominance signal, the second digital image including the luminance signal, a first filtered chrominance signal, and a second filtered chrominance signal, the apparatus comprising:
   means for filtering the first chrominance signal of the first digital image according to the method of claim 1 to produce the first filtered chrominance signal; and
   means for filtering the second chrominance signal of the first digital image according to the method of claim 1 to produce the second filtered chrominance signal.

16. The apparatus of claim 15, wherein the first digital image is encoded according to a first color space, and wherein the apparatus further comprises:
   means for converting a third digital image encoded according to a second color space into the first digital image.

17. The apparatus of claim 16, wherein the means for converting comprises:
   means for subtracting a green color signal of the third digital image from a red color signal of the third digital image to produce the first chrominance signal;
   means for subtracting the green color signal of the third digital image from a blue color signal of the third digital image to produce the second chrominance signal; and
   means for providing the green color signal as the luminance signal.

18. The apparatus of claim 15, further comprising:
   means for converting the second digital image into a fourth digital image encoded according to a third color space.

19. The apparatus of claim 18, wherein the means for converting comprises:
   means for adding the first filtered chrominance signal to the luminance signal of the second digital image to produce a red color signal of the fourth digital image;

means for adding the second filtered chrominance signal to the luminance signal of the second digital image to produce a blue color signal of the fourth digital image; and means for providing the luminance signal of the second digital image as a green color signal of the fourth digital image.

20. A method for filtering a digital input signal to produce a digital output signal, the method comprising steps of:
  (A) performing linear filtering on the digital input signal to produce a filtered digital input signal;
  (B) down-sampling the filtered digital input signal to produce a reduced resolution signal;
  (C) performing median filtering on the reduced resolution signal to produce a filtered reduced resolution signal;
  (D) up-sampling the filtered reduced resolution signal to produce an up-sampled filtered signal; and
  (E) performing low-pass linear filtering on the up-sampled filtered signal to produce the digital output signal.

21. The method of claim 20, wherein the step (B) comprises a step of:
  (B)(1) down-sampling the filtered digital input signal by a down-sampling factor to produce the reduced resolution signal;
  wherein the step (D) comprises a step of:
  (D)(1) up-sampling the filtered reduced resolution signal by an up-sampling factor to produce the up-sampled filtered signal; and
  wherein the up-sampling factor and the down-sampling factor are equal.

22. The method of claim 21, wherein the step (A) comprises a step of:
  (A) performing linear filtering with a rectangular impulse response of length dec on the digital input signal to produce the filtered digital input signal; and
  wherein dec is equal to the down-sampling factor and to the up-sampling factor.

23. The method of claim 22, wherein the step (E) comprises a step of:
  (E)(1) performing low-pass linear filtering with a support of length dec on the up-sampled filtered signal to produce the digital output signal.

24. A multi-resolution filter comprising:
  a resolution reduction filter to produce a reduced resolution signal by reducing the resolution of a digital input signal wherein said resolution reduction filter comprises;
  a linear filter to produce a filtered digital input signal by filtering the digital input signal; and a down-sampler to produce the reduced resolution signal by down-sampling the filtered digital input signal;
  a median filter to produce a filtered reduced resolution signal by filtering the reduced resolution signal; and
  an interpolation filter to produce a digital output signal by interpolating the filtered reduced resolution signal.

25. The multi-resolution filter of claim 24, wherein the linear filter comprises a linear low-pass filter.

26. The multi-resolution filter of claim 25, wherein the linear low-pass filter comprises a mean filter.

27. The multi-resolution filter of claim 24, wherein the interpolation filter comprises:
  an up-sampler to produce an up-sampled filtered signal by up-sampling the filtered reduced resolution signal; and
  a linear low-pass filter to produce the digital output signal by filtering the up-sampled filtered signal.

28. The multi-resolution filter of claim 27, wherein the linear low-pass filter comprises a low-pass filter used in bi-cubic interpolation.

29. A multi-resolution filtering system for producing a second digital image from a first digital image, the first digital image including a luminance signal, a first chrominance signal, and a second chrominance signal, the second digital image including the luminance signal, a first filtered chrominance signal, and a second filtered chrominance signal, the multi-resolution filtering system comprising:
  a first multi-resolution filter according to claim 20 to produce the first filtered chrominance signal by filtering the first chrominance signal of the first digital image; and
  a second multi-resolution filter according to claim 20 to produce the second filtered chrominance signal by filtering the second chrominance signal of the first digital image.

30. The multi-resolution filtering system of claim 29, wherein the first digital image is encoded according to a first color space, and wherein the multi-resolution filtering system further comprises:
  a first color converter to convert a third digital image encoded according to a second color space into the first digital image.

31. The multi-resolution filtering system of claim 30, wherein the first color converter comprises:
  a first subtractor to develop the first chrominance signal by subtracting a green color signal of the third digital image from a red color signal of the third digital image; and
  a second subtractor to develop the second chrominance signal by subtracting the green color signal of the third digital image from a blue color signal of the third digital image.

32. The multi-resolution filtering system of claim 30, further comprising:
  a second color converter to convert the second digital image into a fourth digital image encoded according to a third color space.

33. The multi-resolution filtering system of claim 32, wherein the second color converter comprises:
  a first adder to develop a red color signal of the fourth digital image by adding the first filtered chrominance signal to the luminance signal of the second digital image; and
  a second adder to develop a blue color signal of the fourth digital image by adding the second filtered chrominance signal to the luminance signal of the second digital image.

34. A multi-resolution filter for filtering a digital input signal to produce a digital output signal, the multi-resolution filter comprising:
  a linear filter to produce a filtered digital input signal by filtering the digital input signal;
  a down-sampler to produce the reduced resolution signal by down-sampling the filtered digital input signal;
  a median filter to produce a filtered reduced resolution signal by filtering the reduced resolution signal;
  an up-sampler to produce an up-sampled filtered signal by up-sampling the filtered reduced resolution signal; and
  a linear low-pass filter to produce the digital output signal by filtering the up-sampled filtered signal.

35. The multi-resolution filter of claim 34, wherein the down-sampler has a down-sampling factor that is equal to an up-sampling factor of the up-sampler.

36. The multi-resolution filter of claim 35, wherein the linear filter has a support that is equal to the down-sampling factor and the up-sampling factor.

37. The multi-resolution filter of claim 36, wherein the linear low-pass filter has a support that is equal to the down-sampling factor and the up-sampling factor.

38. An apparatus for filtering a digital input signal to produce a digital output signal, the apparatus comprising:
resolution reduction means for reducing a resolution of the digital input signal to produce a reduced resolution signal, wherein the resolution reduction means comprises:
means for performing linear filtering on the digital input signal to produce a filtered digital input signal; and
means for down-sampling the filtered digital input signal to produce the reduced resolution signal;
median filtering means for performing median filtering on the reduced resolution signal to produce a filtered reduced resolution signal; and
interpolation means for performing interpolation on the filtered reduced resolution signal to produce the digital output signal.

39. The apparatus of claim 38, wherein the means for performing linear filtering comprises means for performing linear low-pass filtering on the digital input signal.

40. The apparatus of claim 39, wherein the means for performing linear low-pass filtering comprises means for performing mean filtering on the digital input signal.

41. The apparatus of claim 38, wherein the interpolation means comprises:
up-sampling means for up-sampling the filtered reduced resolution signal to produce an up-sampled filtered signal; and
means for performing linear low-pass filtering on the up-sampled filtered signal to produce the digital output signal.

42. The apparatus of claim 41, wherein the means for performing linear low-pass filtering comprises means for performing low-pass filtering employed in bi-cubic interpolation on the up-sampled filtered signal to produce the digital output signal.

43. An apparatus for filtering a digital input signal to produce a digital output signal, the apparatus comprising steps of:
means for performing linear filtering on the digital input signal to produce a filtered digital input signal;
means for down-sampling the filtered digital input signal to produce a reduced resolution signal;
means for performing median filtering on the reduced resolution signal to produce a filtered reduced resolution signal;
means for up-sampling the filtered reduced resolution signal to produce an up-sampled filtered signal; and
means for performing low-pass linear filtering on the up-sampled filtered signal to produce the digital output signal.

44. The apparatus of claim 43, wherein the means for down-sampling comprises means for down-sampling the filtered digital input signal by a down-sampling factor to produce the reduced resolution signal, wherein the means for up-sampling comprises means for up-sampling the filtered reduced resolution signal by an up-sampling factor to produce the up-sampled filtered signal, and wherein the up-sampling factor and the down-sampling factor are equal.

45. The apparatus of claim 44, wherein the means for performing linear filtering comprises means for performing linear filtering with a rectangular impulse response of length dec on the digital input signal to produce the filtered digital input signal, and wherein dec is equal to the down-sampling factor and to the up-sampling factor.

46. The apparatus of claim 45, wherein the means for performing low-pass linear filtering comprises means for performing low-pass linear filtering with a support of length dec on the up-sampled filtered signal to produce the digital output signal.

* * * * *